A. CARPENTER.
PLOW.
APPLICATION FILED MAR. 31, 1917.
1,276,720.
Patented Aug. 27, 1918.
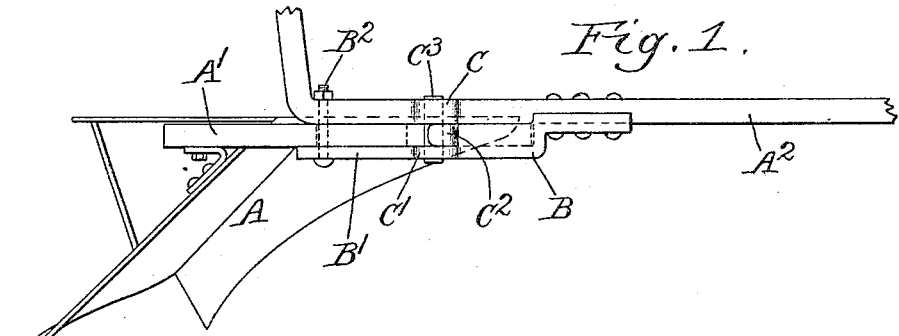
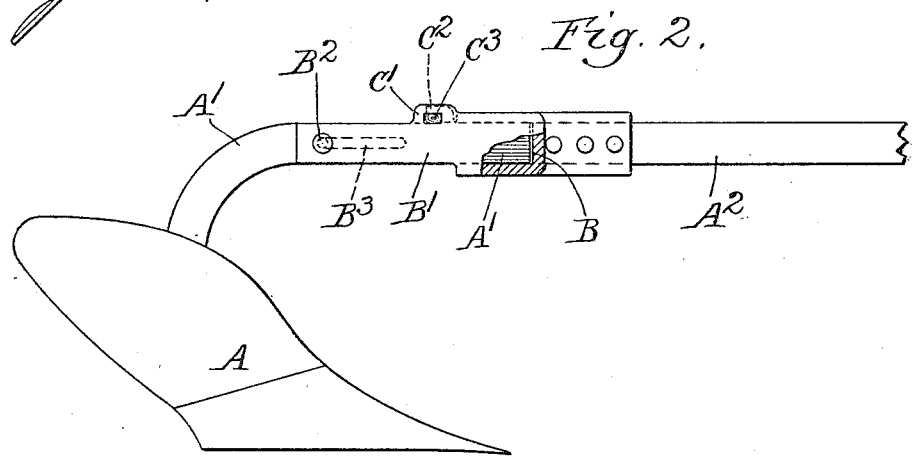
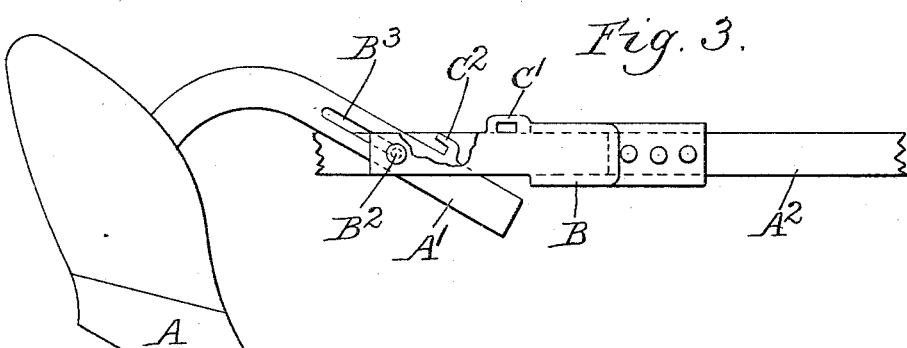
Witnesses.
Edward T. Wray.
Inventor.
Alexander Carpenter.
by Parker & Carter
Attorneys.

UNITED STATES PATENT OFFICE.

ALEXANDER CARPENTER, OF CAREY, OHIO, ASSIGNOR TO NATIONAL TRACTOR & PLOW COMPANY, OF CAREY, OHIO, A CORPORATION OF OHIO.

PLOW.

1,276,720.     Specification of Letters Patent.     Patented Aug. 27, 1918.

Application filed March 31, 1917. Serial No. 158,804.

*To all whom it may concern:*

Be it known that I, ALEXANDER CARPENTER, a citizen of the United States, residing at Carey, in the county of Wyandot and State of Ohio, have invented a certain new and useful Improvement in Plows, of which the following is a specification.

My invention relates to plows. It has for one object to provide a new and improved form of plow which may be used in connection with power driven machinery. Another object is to provide a new and improved means of fastening and supporting a plow from a power driven plow frame. Another object is to provide automatic releasing means for releasing the plow when it strikes any immovable structure. Other objects will appear from time to time in the specification.

It will be understood that when a power driven plow strikes a stone or other impassable obstruction, there is danger of breaking the plow, or danger of breaking the driving mechanism or some other part if release means are not provided. However, when the release means have once operated, it is necessary that the operator be able, with a minimum of difficulty, to put the plow back into operation because since a number of plows and an expensive machine are at rest, if the operator has a great deal of trouble repairing the damage done or relieving the break, it is possible that a great deal of valuable time will be wasted. My invention, therefore, provides means which first enable the operator, if he is alert, to stop his driving mechanism before the plow gets out of line, even though the release is broken, and provides second, means for easily and conveniently repairing the break.

My invention is illustrated more or less diagrammatically in the accompanying drawings, wherein Figure 1 is a plan view of a plow and a part of a plow frame;

Fig. 2 is a side elevation in part section showing the plow in the normal operative position;

Fig. 3 is a side elevation showing the plow after the release has broken and while it is in engagement with an impassable object.

Like parts are indicated by like figures in the three drawings.

A is the ordinary type of plow. It is mounted on a stub plow beam $A^1$. $A^2$ is an ordinary type of gang plow frame of the kind that is suspended from the engine and driven by the engine, though it might be any suitable type.

B is a socket on the engine gang frame $A^2$. It is formed by a piece bolted to the part $A^2$ as indicated, and this piece is provided with a rearwardly extending extension $B^1$ placed outwardly from the member $A^2$ and so arranged that the stub plow beam $A^1$ may be contained in the space between the frame $A^2$ and the part $B^1$, so that the end of the stub plow beam may be engaged in the socket B. $B^2$ is a bolt tying the parts $A^2$, $B^1$ together, and this bolt is adapted to engage a slot $B^3$ in the plow beam $A^1$.

C, $C^1$ are socket lugs extending upwardly from the members $A^2$, $B^1$ in register one with another. In register with them also when the stub plow beam is in engagement with the socket, is a hook $C^2$. $C^3$ is a breaker pin driven through the lug socket C, $C^1$, and through the hook $C^2$ to hold the part together in the position shown in Fig. 2. This pin is preferably of wood, though it might be made of any other suitable relatively weak or yielding material such that it will break in shear before a load sufficient to break or damage any of the other parts of the apparatus is placed upon the plow.

Under ordinary circumstances the pin is strong enough to drive the plow through the ordinary ground and do the plowing work. When, however, the plow strikes an obstruction, as for instance the stone indicated, which cannot be pushed aside or which cannot be passed over, the strain upon the shear pin becomes too great and it shears off, the plow remains then at rest and the plow frame goes on. If the operator is alert, he will notice this, and may have time to stop the apparatus before the end of the plow beam will have completely left the socket. Then all he has to do is to get out, remove the obstruction, and back his engine, until the plow beam again is located at the bottom of the socket, when he can replace the pin and go ahead without interrupting the furrow at all. If, however, his speed is too great, or he does not notice in time, the plow will move back a short distance until the end of the plow beam clears the socket, when the plow will rotate into a position such as shown in Fig. 3. This rotation will continue until the plow rides freely on its point and swings up and over the obstruction. This rearward movement, of course, is made possible by the slot in the beam engaging the pin or bolt holding the parts together.

It will be understood that this is an important feature, particularly in connection with close coupled tractor engines where the operator sits right over the plows. In order that the machine will take up a minimum of room and be easily handled and controlled, it is desirable to have the plows right up close to the end of the machine, and if the plow swung up immediately beneath the operator it might throw him off the seat. My arrangement with the elongated slot in the plow beam makes it possible for the plow to slide back far behind the operator so as not to throw him out of his seat before it commences to turn over. The result is that the plow is near enough to the engine to be used in constricted quarters but is automatically moved far enough back of the engine to enable it to turn over without damage or danger.

Another advantage of this structure is that the plow, as soon as the shear pin is broken, has a moment of looseness and easiness, so that it may adjust itself to the obstruction, and this makes it easier for the plow to ride up over the obstruction. Moreover, it gives a stiff and rigid connection between the stub plow beam and the engine frame, but at the same time permits the pivot point to be very close to the forward end of the plow beam, thus enabling the plow beam to be very sensitive, enabling it to be easily rotated and enabling it to swing clear of the obstacle without bending or breaking the point of the plow.

It will be evident that while I have shown in my drawings a particular form of operative structure, different arrangements of parts might be used, that the plow might be used with different types of plow beams, or different types of engine frames, that a different type of shear pin might be used, and in fact that many changes might be made both in size, shape and arrangement of parts without departing materially from the spirit of my invention. I wish, therefore that my drawings be regarded as in a sense diagrammatic.

I claim:

1. A plow comprising a horizontally disposed draft bar arranged in the line of the draft, a plow beam parallel with and adjacent the end thereof, a plow rigidly mounted on the beam, a socket carried by the draft bar engaged by the forward end of the plow beam, a slot and pin interposed between the plow beam and the draft bar adapted to permit longitudinal movement of the plow beam with respect to the draft bar and to hold the end of the plow beam deeply embedded in the socket, the arrangement of the parts being such that when the holding means are released the plow beam may draw back out of the socket and then only rotate with respect to the draft bar.

2. The combination with a plow frame of a plow beam, a plow thereon, a slidable and pivotal connection between the beam and frame, means for releasably holding the beam in position with respect to the frame, means for limiting the rearward slidable movement of the beam with respect to the frame, means for holding the beam against rotation with respect to the frame until the beam has moved to the limit of its rearward excursion, and means for holding the beam as it rotates on the axis in a plane perpendicular to its line of slidable movement.

In testimony whereof, I affix my signature in the presence of two witnesses this 23rd day of March, 1917.

ALEXANDER CARPENTER.

Witnesses:
GEO. J. NURHARD,
C. G. SPENCER.

Copies of this patent may be obtained for five cents each, by addressing the "Commissioner of Patents, Washington, D. C."